(12) United States Patent
Bacallao et al.

(10) Patent No.: US 10,040,468 B2
(45) Date of Patent: *Aug. 7, 2018

(54) SHOPPING CART BASKET

(71) Applicant: Wal-Mart Stores, Inc., Bentonville, AR (US)

(72) Inventors: Yurgis Mauro Bacallao, Centerton, AR (US); Dennis Charles Beere, II, Centerton, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,367

(22) Filed: Jul. 5, 2017

(65) Prior Publication Data

US 2018/0009460 A1   Jan. 11, 2018

Related U.S. Application Data

(60) Provisional application No. 62/359,435, filed on Jul. 7, 2016.

(51) Int. Cl.
*B62B 3/14* (2006.01)
*B62B 5/00* (2006.01)

(52) U.S. Cl.
CPC ............ *B62B 3/1464* (2013.01); *B62B 5/00* (2013.01)

(58) Field of Classification Search
CPC ........ B65B 67/1227; B65B 2067/1294; B62B 3/1472; B62B 3/1464; B62B 2202/26; B62B 5/00

(Continued)

(56) References Cited

U.S. PATENT DOCUMENTS 259,932 A   6/1882   Sims
370,563 A   9/1887   Simmons
(Continued)

FOREIGN PATENT DOCUMENTS

AU   1142402 A1   4/2002
AU   2002364902 A1   5/2004
(Continued)

OTHER PUBLICATIONS

Search Report in UK Patent Application No. GB1621562.6, dated Jun. 14, 2017; 4 pages.

(Continued)

*Primary Examiner* — Justin Larson
(74) *Attorney, Agent, or Firm* — Schmeiser, Olsen & Watts LLP (57) ABSTRACT

Described is a shopping cart basket for affixing to a shopping cart. The shopping cart basket can be used to carry tools, accessories, or other items that an individual wants to carry with, but keep separate from, items in the shopping cart. The shopping cart basket includes a basket body with a pair of hooks on arms that hook the shopping cart basket to the shopping cart. The shopping cart basket can be hung from many different locations on a shopping cart, including the front or back, the sides, the inside, or the outside. The shopping cart basket can be hung from any type of shopping cart, including basket types of shopping carts or flatbed carts. The shopping cart basket includes elements that hold and secure tools commonly used by employees performing tasks with a shopping cart.

19 Claims, 8 Drawing Sheets

(58) Field of Classification Search
USPC ........ 224/411; 280/33.992; D6/566; D34/27; 248/301
See application file for complete search history.

(56) References Cited

U.S. PATENT DOCUMENTS

| | | | |
|---|---|---|---|
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,284,579 A | 11/1918 | Brown | |
| 1,662,140 A | 3/1928 | Whitesides | |
| 2,240,629 A | 5/1941 | Smith | |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 3,133,660 A | 5/1964 | Roberts | |
| 3,266,742 A | 8/1966 | Pena | |
| 3,313,504 A | 4/1967 | Thorkild | |
| 3,339,745 A * | 9/1967 | Sugerman | A47F 7/02 211/85.2 |
| D209,279 S * | 11/1967 | Cohen | D34/17 |
| 3,438,644 A | 4/1969 | Kaplan et al. | |
| 3,475,067 A | 10/1969 | Girard | |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,376,502 A * | 3/1983 | Cohen | B62B 3/1464 224/411 |
| 4,403,807 A | 9/1983 | Wilkinson et al. | |
| 4,456,125 A | 6/1984 | Chap | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,728,070 A | 3/1988 | Engelbrecht | |
| 4,838,504 A | 6/1989 | Bittenbinder | |
| D302,062 S | 7/1989 | Sable | |
| 4,881,577 A | 11/1989 | Stroh et al. | |
| 4,968,047 A | 11/1990 | Ferris | |
| 4,974,799 A | 12/1990 | Palmer | |
| 4,998,647 A | 3/1991 | Sharp | |
| 4,998,694 A | 3/1991 | Barteaux | |
| 5,190,253 A | 3/1993 | Sable | |
| 5,362,077 A * | 11/1994 | Adamson | B62B 3/1472 211/71.01 |
| 5,366,123 A | 11/1994 | Range | |
| 5,385,318 A | 1/1995 | Rizzuto | |
| 5,390,443 A | 2/1995 | Emalfarb et al. | |
| 5,437,346 A | 8/1995 | Dumont | |
| 5,443,173 A | 8/1995 | Emery et al. | |
| D363,208 S * | 10/1995 | Seidel | D6/566 |
| 5,460,279 A | 10/1995 | Emery et al. | |
| 5,465,846 A | 11/1995 | Blyth et al. | |
| 5,531,366 A | 7/1996 | Strom | |
| 5,564,566 A | 10/1996 | Lamb | |
| 5,618,008 A | 4/1997 | Dearwester et al. | |
| 5,704,497 A | 1/1998 | Wyatt | |
| 5,727,721 A | 3/1998 | Guido et al. | |
| D396,372 S * | 7/1998 | Goodman | D6/566 |
| 5,836,486 A * | 11/1998 | Ohsugi | A47G 25/32 211/113 |
| 5,875,902 A | 3/1999 | Emery et al. | |
| D412,080 S * | 7/1999 | Emery | D6/513 |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A | 8/2000 | Emalfarb et al. | |
| 6,155,521 A | 12/2000 | O'hanlon | |
| 6,170,679 B1 | 1/2001 | Frye | |
| 6,193,265 B1 | 2/2001 | Yemini | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,390,422 B2 | 5/2002 | Banko | |
| 6,409,031 B1 | 6/2002 | Wynne | |
| D459,979 S * | 7/2002 | Goodman | D6/566 |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |
| 6,726,156 B1 | 4/2004 | Scola | |
| D490,691 S | 6/2004 | Buss et al. | |
| 6,745,186 B1 | 6/2004 | Testa et al. | |
| 6,789,687 B2 | 9/2004 | Cramer | |
| 6,805,271 B2 | 10/2004 | Holden | |
| 6,810,149 B1 | 10/2004 | Squilla et al. | |
| 6,832,739 B2 | 12/2004 | Kraus | |
| 6,886,101 B2 | 4/2005 | Glazer et al. | |
| 6,937,989 B2 | 8/2005 | Mcintyre et al. | |
| 7,066,389 B2 | 6/2006 | Dickover et al. | |
| 7,077,612 B1 | 7/2006 | Giggle, III et al. | |
| 7,128,251 B1 | 10/2006 | Galle | |
| 7,172,092 B2 | 2/2007 | Yang et al. | |
| 7,177,820 B2 | 2/2007 | Mcintyre et al. | |
| 7,182,210 B2 | 2/2007 | Metcalf | |
| 7,192,035 B1 | 3/2007 | Lioce | |
| D540,591 S | 4/2007 | Snell | |
| 7,222,363 B2 | 5/2007 | Rice et al. | |
| D552,901 S | 10/2007 | Wilfong, Jr. et al. | |
| D571,518 S * | 6/2008 | Waldman | D34/6 |
| D575,973 S * | 9/2008 | Goodman | D6/566 |
| 7,431,208 B2 | 10/2008 | Feldman et al. | |
| 7,475,885 B2 | 1/2009 | Kovath | |
| 7,530,537 B2 * | 5/2009 | Kandah | B65B 67/1216 220/482 |
| 7,587,756 B2 | 9/2009 | Peart et al. | |
| 7,610,717 B2 | 11/2009 | Luken et al. | |
| 7,654,409 B2 | 2/2010 | Hoffman | |
| 7,716,064 B2 | 5/2010 | Mcintyre et al. | |
| D616,680 S | 6/2010 | Snider | |
| 7,850,014 B2 | 12/2010 | Nguyen et al. | |
| 7,887,068 B2 | 2/2011 | Ferguson | |
| 8,069,092 B2 | 11/2011 | Bryant | |
| D650,209 S | 12/2011 | Snider | |
| D654,737 S * | 2/2012 | Guindi | D6/514 |
| D666,858 S * | 9/2012 | Goodman | D6/566 |
| D667,250 S * | 9/2012 | Goodman | D6/566 |
| 8,292,094 B2 | 10/2012 | Morton | |
| 8,336,800 B1 | 12/2012 | Lopez | |
| D689,282 S | 9/2013 | Lindeman | |
| 8,572,712 B2 | 10/2013 | Rice et al. | |
| D693,577 S | 11/2013 | Goodman et al. | |
| 8,668,207 B1 | 3/2014 | Gilliam | |
| 8,746,640 B2 | 6/2014 | Broadley et al. | |
| 8,814,039 B2 | 8/2014 | Bishop et al. | |
| D713,663 S * | 9/2014 | Pryor | D6/709.2 |
| 8,820,633 B2 | 9/2014 | Bishop et al. | |

(56) References Cited

U.S. PATENT DOCUMENTS

| | | | |
|---|---|---|---|
| 8,851,369 B2 | 10/2014 | Bishop et al. | |
| D718,054 S | 11/2014 | Goodman et al. | |
| D719,372 S * | 12/2014 | Goodman | D6/514 |
| 8,905,411 B1 | 12/2014 | Blanton | |
| D720,538 S | 1/2015 | Goodman et al. | |
| D728,255 S | 5/2015 | Guindi et al. | |
| 9,199,656 B1 | 12/2015 | Tong et al. | |
| D746,592 S | 1/2016 | Goodman et al. | |
| D747,876 S | 1/2016 | Goodman et al. | |
| D750,472 S | 3/2016 | Kuka | |
| D751,763 S * | 3/2016 | Goodman | D26/38 |
| D784,721 S | 4/2017 | Goodman et al. | |
| 9,623,995 B2 | 4/2017 | Tan | |
| D785,333 S | 5/2017 | Goodman et al. | |
| D785,369 S * | 5/2017 | Goodman | D6/566 |
| D787,303 S | 5/2017 | Garvin | |
| 9,656,827 B2 | 5/2017 | Sudhir | |
| 9,737,141 B2 | 8/2017 | Johnson | |
| D796,771 S * | 9/2017 | Bacallao | D34/27 |
| D803,032 S | 11/2017 | Jammehdiabadi | |
| 9,844,283 B2 * | 12/2017 | Bacallao | A47F 9/042 |
| 2002/0145086 A1 | 10/2002 | Alvarado et al. | |
| 2002/0170937 A1 | 11/2002 | Yeh et al. | |
| 2002/0185510 A1 | 12/2002 | Holsclaw | |
| 2002/0185513 A1 | 12/2002 | Morris | |
| 2003/0000905 A1 | 1/2003 | Zidek | |
| 2003/0042694 A1 | 3/2003 | Werner | |
| 2003/0052464 A1 | 3/2003 | McGuire | |
| 2003/0098326 A1 | 5/2003 | Wile | |
| 2003/0121871 A1 | 7/2003 | Ladro | |
| 2003/0198390 A1 | 10/2003 | Loui et al. | |
| 2004/0000529 A1 | 1/2004 | Gladnick et al. | |
| 2004/0000612 A1 | 1/2004 | Young | |
| 2004/0075015 A1 | 4/2004 | Cain et al. | |
| 2004/0124598 A1 | 7/2004 | Williams | |
| 2004/0139398 A1 | 7/2004 | Testa et al. | |
| 2004/0178298 A1 | 9/2004 | Kennard | |
| 2004/0262385 A1 | 12/2004 | Blaeuer | |
| 2005/0056718 A1 | 3/2005 | Kamenstein | |
| 2005/0205578 A1 | 9/2005 | Yeh | |
| 2005/0284729 A1 | 12/2005 | LoRusso | |
| 2006/0097467 A1 | 5/2006 | Solomon et al. | |
| 2006/0124799 A1 | 6/2006 | Johnson | |
| 2006/0226187 A1 | 10/2006 | Linker | |
| 2007/0095769 A1 | 5/2007 | Jenkins | |
| 2007/0176058 A1 | 8/2007 | Kohn | |
| 2007/0186515 A1 | 8/2007 | Ruetten et al. | |
| 2007/0204044 A1 | 8/2007 | Rice et al. | |
| 2007/0261159 A1 | 11/2007 | Marks | |
| 2007/0278359 A1 | 12/2007 | Kandah | |
| 2008/0000910 A1 | 1/2008 | Gaillard | |
| 2008/0001019 A1 | 1/2008 | Brown | |
| 2008/0215448 A1 | 9/2008 | Boyle et al. | |
| 2008/0215449 A1 | 9/2008 | Boyle et al. | |
| 2008/0245684 A1 | 10/2008 | Yeatman | |
| 2009/0078731 A1 | 3/2009 | Yi | |
| 2009/0078815 A1 | 3/2009 | Tong et al. | |
| 2009/0092342 A1 | 4/2009 | Rolim de Oliveira | |
| 2009/0184162 A1 | 7/2009 | Rice et al. | |
| 2009/0261050 A1 | 10/2009 | Curren | |
| 2009/0319352 A1 | 12/2009 | Boyle et al. | |
| 2009/0327087 A1 | 12/2009 | Beck et al. | |
| 2010/0096514 A1 | 4/2010 | Adair et al. | |
| 2010/0102014 A1 | 4/2010 | Yang | |
| 2010/0123050 A1 | 5/2010 | Astwood | |
| 2010/0148019 A1 | 6/2010 | Simhaee | |
| 2010/0219219 A1 | 9/2010 | Svetina | |
| 2010/0264101 A1 | 10/2010 | Ma | |
| 2011/0266092 A1 | 11/2011 | Marquis et al. | |
| 2012/0125970 A1 | 5/2012 | Tsui | |
| 2012/0167182 A1 | 6/2012 | Rice et al. | |
| 2012/0169020 A1 | 7/2012 | Farrell | |
| 2012/0305618 A1 | 12/2012 | Tan | |
| 2012/0305619 A1 | 12/2012 | Tan | |
| 2013/0026120 A1 | 1/2013 | Johnson | |
| 2013/0037665 A1 | 2/2013 | Brasell et al. | |
| 2013/0092804 A1 | 4/2013 | Laitila et al. | |
| 2013/0134181 A1 | 5/2013 | Helseth et al. | |
| 2013/0330163 A1 | 12/2013 | Marsh | |
| 2014/0048576 A1 | 2/2014 | Tan | |
| 2014/0131506 A1 | 5/2014 | Clarkin | |
| 2014/0144966 A1 | 5/2014 | Tan | |
| 2014/0209651 A1 | 7/2014 | Wilfong | |
| 2014/0367507 A1 | 12/2014 | Trampolski | |
| 2016/0016752 A1 | 1/2016 | Helseth et al. | |
| 2016/0096542 A1 | 4/2016 | Fukushima | |
| 2016/0183744 A1 | 6/2016 | Sadikov et al. | |
| 2016/0227969 A1 | 8/2016 | Morris | |
| 2016/0242605 A1 | 8/2016 | Heymann et al. | |
| 2016/0270607 A1 | 9/2016 | Zeng | |
| 2016/0300235 A1 | 10/2016 | Boyle et al. | |
| 2016/0367088 A1 | 12/2016 | Allard et al. | |
| 2017/0066550 A1 | 3/2017 | Tsai | |
| 2017/0172322 A1 | 6/2017 | Bacallao | |
| 2017/0174243 A1 * | 6/2017 | Bacallao | B62B 3/106 |
| 2017/0197650 A1 * | 7/2017 | Whistler | B62B 3/1472 |
| 2017/0259959 A1 | 9/2017 | Nilsson et al. | |
| 2017/0267412 A1 | 9/2017 | Krause | |
| 2017/0275126 A1 | 9/2017 | Sudhir | |
| 2017/0325603 A1 * | 11/2017 | Bacallao | A47F 9/042 |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 A1 | 6/2013 |

OTHER PUBLICATIONS

Search Report in UK Patent Application No. GB1621564.2 dated Jun. 15, 2017; 5 pages.
Search Report in UK Patent Application No. GB1702839.0 dated Jun. 14, 2017; 5 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser for Retail Supermarket Brand New!" Ebay.com, accessed on Nov. 17, 2016; 5 pages.

(56) References Cited

OTHER PUBLICATIONS

"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," OrganizeIt.com, accessed on Jun. 14, 2017; 2 pages.
"Simplehuman Stainless Steel Grocery Bag Holder," ContainerStore.com, accessed on Jun. 14, 2017; 2 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Non-Final Office Action in U.S. Appl. No. 15/383,151, dated May 25, 2018; 13 pages.

* cited by examiner

SHOPPING CART BASKET

CROSS REFERENCE TO RELATED APPLICATION

This invention claims priority to U.S. provisional patent application Ser. No. 62/359,435, filed Jul. 7, 2016 to Applicant Wal-Mart Stores Inc., and entitled "Shopping Cart Basket", the disclosure of which is hereby incorporated entirety herein by reference.

BACKGROUND OF THE INVENTION

Technical Field

This invention relates to retail store shopping carts and specifically to an accessory basket that is hung from a shopping cart.

State of the Art

Shopping carts are used in retail stores by both customers and employees. When employees are using a shopping cart, they are often using it to perform stock-related tasks such as returning items to shelves or gathering items from shelves. As the shopping cart is filled with items, there is often not enough room to put the tools the employee uses in their job, such as mobile scanners, printers, tape, counters, etc, in the shopping cart itself. What is needed is an accessory basket that can hold the tools an employee uses while doing tasks, so that these tools do not interfere with or get lost among the items in the shopping cart, and the items in the shopping cart do not harm or interfere with the tools. Additionally, when using a flatbed-type cart, there is no basket available to store items. A basket that hangs from a flatbed cart is needed to store smaller items that might fall off of the flatbed.

Accordingly, what is needed is an accessory shopping cart basket that hangs from a shopping cart for carrying items in a retail store.

DETAILED DESCRIPTION OF EMBODIMENTS OF THE INVENTION

As discussed above, embodiments of the present invention relate to retail store shopping carts, and specifically to an accessory shopping cart basket that is hung from a shopping cart. Disclosed is a shopping cart basket for affixing to a shopping cart. The disclosed shopping cart basket hangs from the shopping cart. The disclosed shopping cart basket is separate from, and should not be confused with, the 'basket' part of a shopping cart. The disclosed shopping cart basket is a separate basket that is removeably affixed to the shopping cart. The shopping cart basket can be used to carry tools, accessories, or other items that an individual wants to carry with, but keep separate from, items in the shopping cart. Or, the shopping cart basket can be used to carry items in addition to the items in the shopping cart. The shopping cart basket includes a pair of hooks on arms that hook the shopping cart basket to the shopping cart. The shopping cart basket can be hung from many different locations on a shopping cart, including the front or back, the sides, the inside, or the outside. The shopping cart basket can be hung from any type of shopping cart, including basket types of shopping carts or flatbed types of carts. The shopping cart basket includes elements that hold and secure tools commonly used by employees performing tasks with a shopping cart. The shopping cart basket holds employee tools in an accessible location and does not allow the tools to get lost or mingled with items in the shopping cart.

The disclosed shopping cart basket includes a basket body and a first and a second hook for hanging the basket body from the shopping cart. The hooks are often hung from a rod of a shopping cart. The rod can be a part of many different types of shopping carts. The shopping cart basket also includes a means to hang shopping bags from a front side of the basket body. An employee often needs a means to hang empty or full shopping bags while they are using the shopping cart. The shopping cart basket includes at least one means to hang shopping bags.

The disclosed shopping cart basket also includes a means to hook a rear side of the basket body to a vertical rod of a shopping cart. When the shopping cart basket is hung from a basket-type shopping cart, it is often useful to secure the basket body to a side of the shopping cart so that the shopping cart basket does not swing or move around. The shopping cart basket includes at least one means to secure the rear side of the basket body to a vertical rod of the shopping cart.

Figure 1:
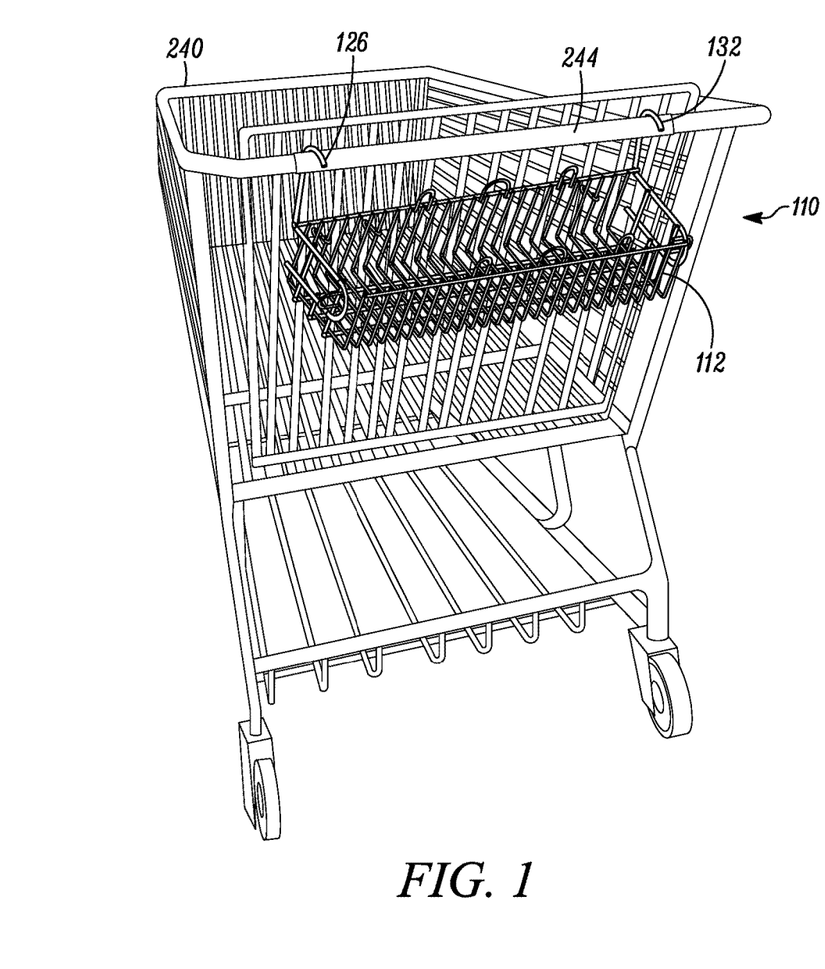
FIG. 1 shows a rear perspective view of a shopping cart basket hanging from a shopping cart.

FIG. 1 shows a perspective view of a shopping cart basket 110 hung from a shopping cart 240. Shopping cart basket 110 includes a basket body 112 and a pair of hooks, including first hook 126 and second hook 132, that hang shopping cart basket 110 on shopping cart 240. Once shopping cart basket 110 is hung from shopping cart 240, shopping cart basket 110 can be used to hold and store tools, portable electronics, tape, markers, or other items that an employee needs while using shopping cart 240. An employee might be using shopping cart 240 to collect items for orders, for example, and does not want their portable scanner, tape, paper, pens, etc, to be mixed in with the ordered items that are being collected in shopping cart 240. Shopping cart basket 110 can contain the tools and accessories needed by the employee, and keeps the tools and accessories in shopping cart basket 110 separate from ordered items in shopping cart 240. As another example, ordered items being gathered with shopping cart 240 may not leave enough room for the tools to be kept inside shopping cart 240, so shopping cart basket 110 can be hung on the outside of shopping cart 240, without taking up space within shopping cart 240. It is to be understood that shopping cart basket 110 can be used for many other purposes, including by a customer of the retail store.

In the embodiment shown in FIG. 1, hooks 126 and 132 are hung from a handle 244 of shopping cart 240, with shopping cart basket 110 on the outside of shopping cart 240, but this is not meant to be limiting. Shopping cart basket 110 can be hung anywhere on shopping cart 240, inside or outside, front, back, or sides. Shopping cart basket 110 can be hung from a top rod of shopping cart 240, or any other rods that make up shopping cart 240.

Figure 2:
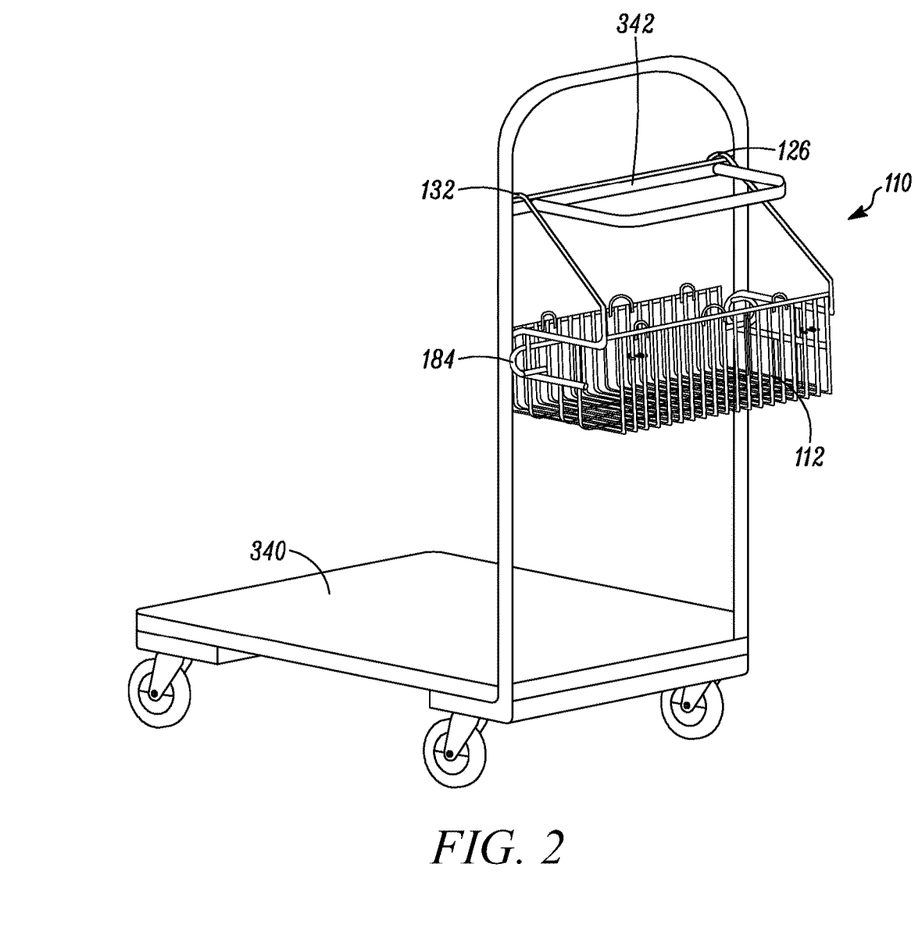
FIG. 2 shows a perspective view of a shopping cart basket hanging from a flatbed cart.

Shopping cart basket 110 can be used with many different types of shopping carts. FIG. 2 shows a perspective view of shopping cart basket 110 hung from a flatbed cart 340. In this embodiment, shopping cart basket 110 is hung from a top rod 342 of flatbed cart 340. Shopping cart 340 does not include a basket feature, but instead uses a flatbed to carry items. When shopping cart basket 110 is used with flatbed cart 340, shopping cart basket 110 provides a basket-type feature for use with flatbed cart 340. An employee (or a customer in some situations) using shopping cart basket 110 with flatbed cart 340 will be able to put tools and items in shopping cart basket 110 instead of setting them on the flatbed.

Figure 3:
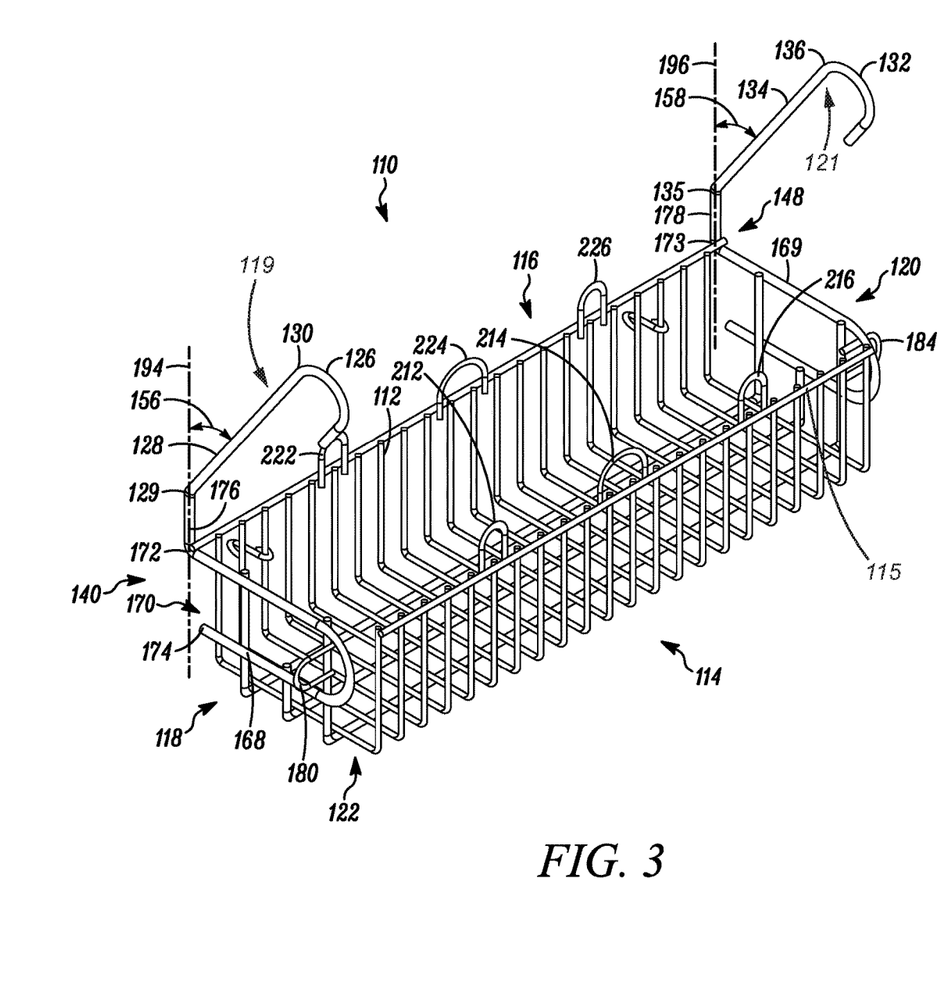
FIG. 3 shows a front perspective view of a shopping cart basket.
Figure 4:
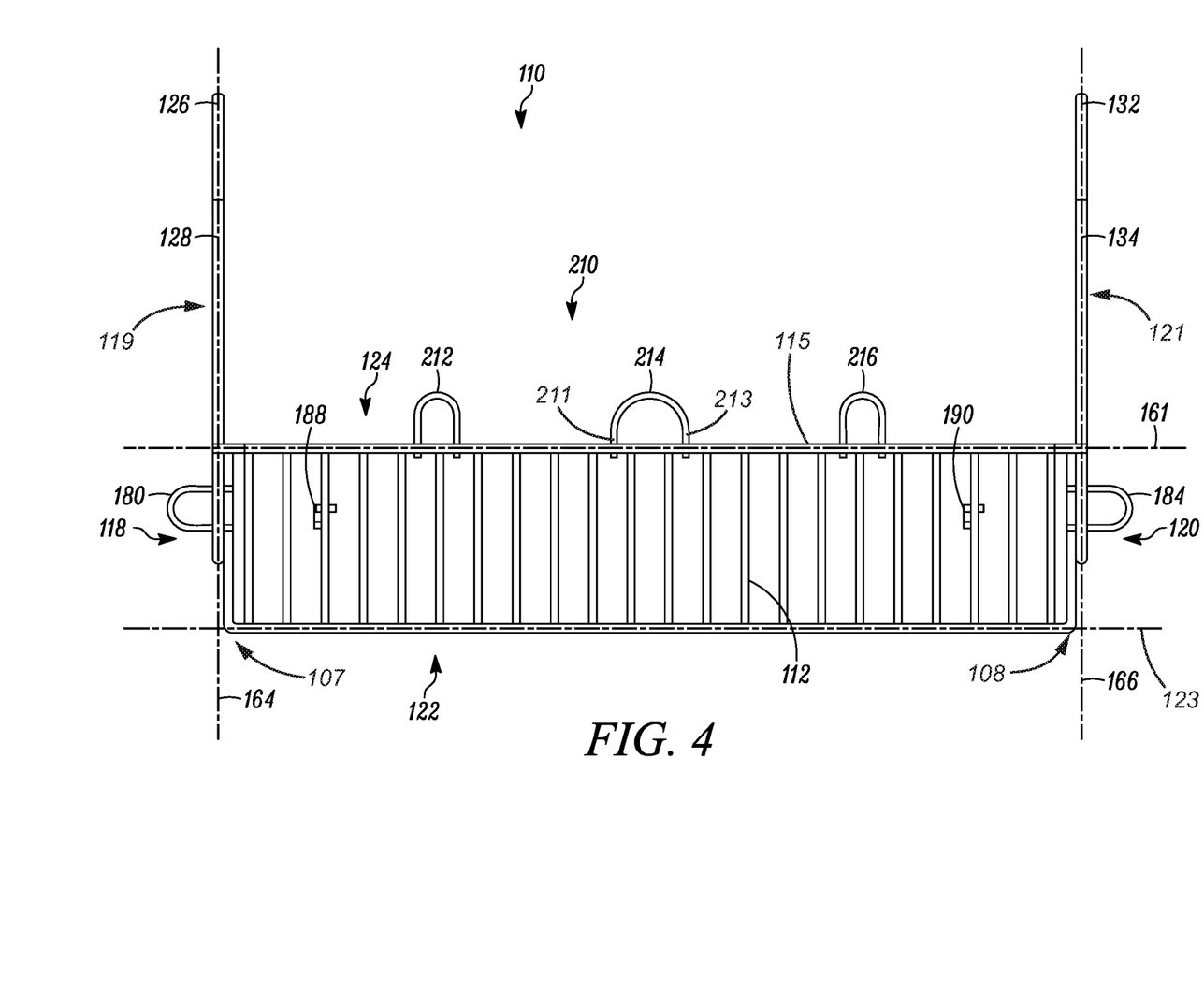
FIG. 4 shows a front view of the shopping cart basket of FIG. 3.
Figure 5:
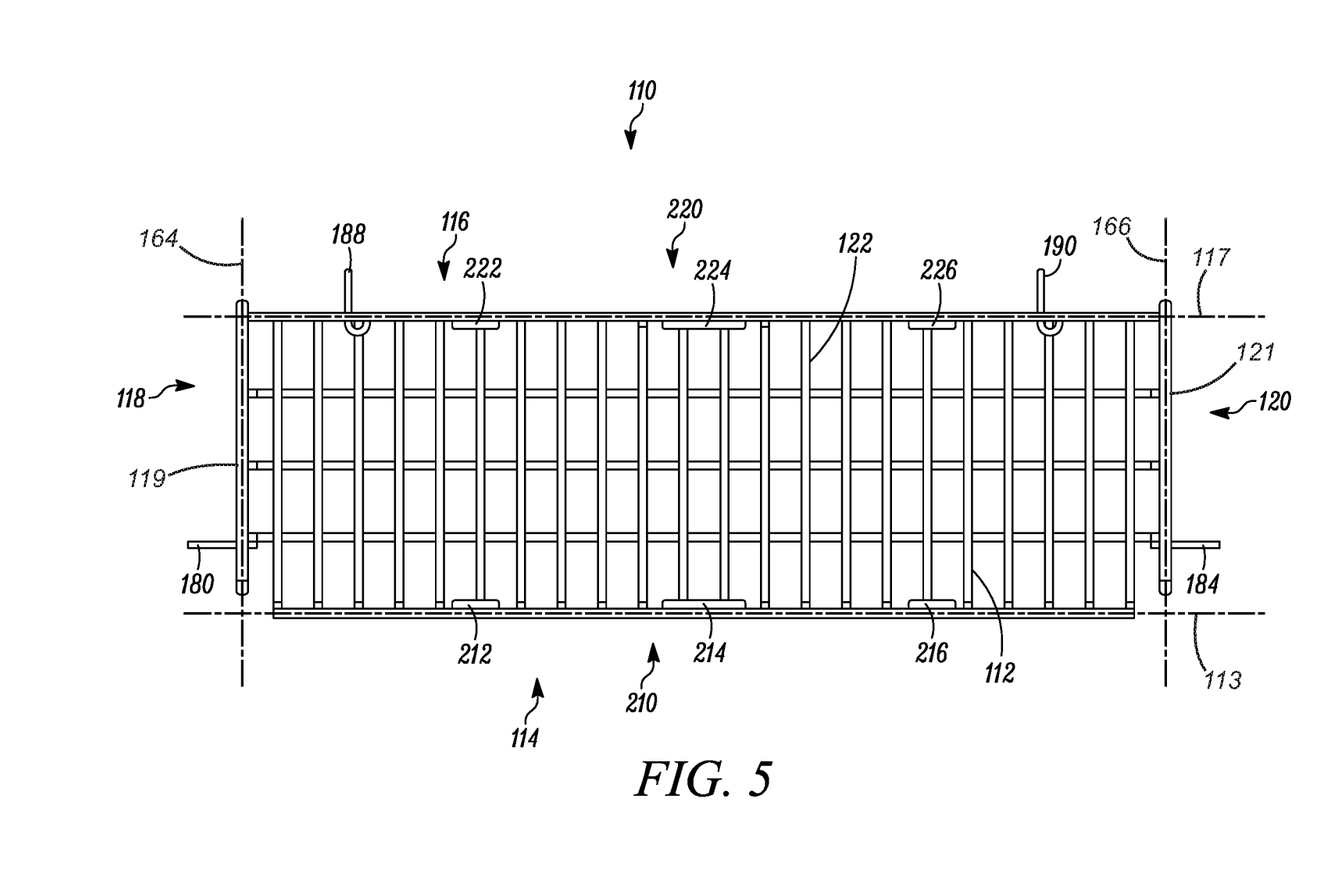
FIG. 5 shows a top view of the shopping cart basket of FIG. 3.
Figure 6:
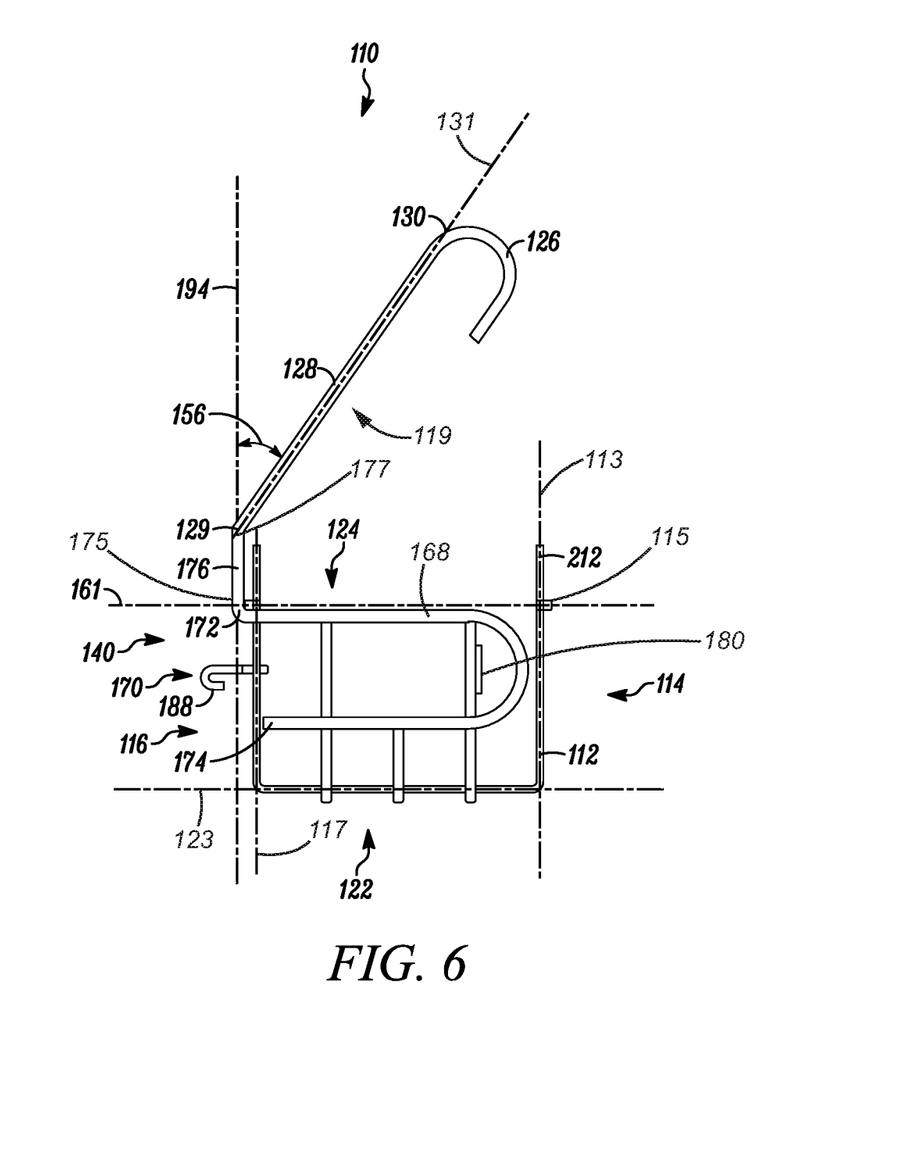
FIG. 6 shows a side view of the shopping cart basket of FIG. 3.

FIG. 3 through FIG. 6 shows details of shopping cart basket 110. FIG. 3 shows a front perspective view of shopping cart basket 110. FIG. 4 shows a front view of shopping cart basket 110. FIG. 5 shows a top view of shopping cart basket 110. FIG. 6 shows a side view of shopping cart basket 110.

Shopping cart basket 110 includes basket body 112. Basket body 112 is a basket with an open top 124. In this embodiment, basket body 112 is rectangular basket shaped, but this is not meant to be limiting. Basket body 112 can have many different shapes. In the embodiment shown in the figures, basket body 112 includes a basket front side 114, a basket rear side 116, a first end side 118, a second end side 120, a basket bottom 122, and open top 124. Basket front side 114, basket rear side 116, basket bottom 122, first end side 118 and second end side 120 are coupled together to form rectangular-shaped basket body 112 with open top 124. Shopping cart basket 110 also includes first hook 126 and second hook 132. First and second hook 126 and 132 are used to hang shopping cart basket 110 from shopping cart 240 or 340, for example. First hook 126 is a part of first end side 118 in this embodiment, and second hook 132 is a part of second end side 120, but this is not meant to be limiting. In some embodiments, first and second hook 126 and 132 are coupled to other locations on basket body 112.

In the embodiment shown in the figures, shopping cart basket 112 is formed of a wire grid, but this is not meant to be limiting. Specifically, shopping cart basket front side 114, basket rear side 116, and basket bottom 122 are each formed of a grid of wire rods in this embodiment. In some embodiments, basket front side 114, basket rear side 116, and basket bottom 122 are formed of a unitary grid of wire rods that are bent into shape of a basket bottom, front, rear sides.

First end side 118 includes a first bent rod 119, best seen in FIG. 3 and FIG. 6. Second end side 120 opposing first end side 118 includes a second bent rod 121, best seen in FIG. 3. First end side 118 is coupled to a basket bottom first end 107 (FIG. 4). Second end side 120 is coupled to a basket bottom second end 108 in this embodiment. In this embodiment, the wire rods that make up shopping cart basket 112 are plastic coated, but this is not meant to be limiting. In some embodiments, shopping cart basket 112 is formed of solid metal, plastic, or wood. In some embodiments, shopping cart basket 112 is formed of a grid of other rigid material such as wood or plastic.

First and second end side 118 and 120 are each formed of a single unitary bent rod, bent rods 119 and 121. Bent rods 119 and 121 are each bent from one piece of rod that forms a side of basket body 112 and includes hooks 126 and 132. Making a basket side and a hook out of one bent rod makes shopping cart basket 110 stronger and easier to manufacture and allows shopping cart basket 110 to flex without breaking. Other advantages of forming the basket sides and hook from a single unitary bent rod are discussed herein.

First bent rod 119 is bent into a shape that lies in a single plane, first end side plane 164, as shown in FIG. 4 and FIG. 5. First bent rod 119 includes a U-shaped portion 168, a straight rod section 176, arm 128, and hook 126.

U-shaped portion 168 is the part of first bent rod 119 that forms a first side of basket body 112. U-shaped portion 168 is a portion of first bent rod 119 that is bent into a U shape. Having a bent U-shaped rod be the side of basket body 112 provide advantages in that U-shaped portion 168 keeps items in basket body 112, and yet a user can put their hand in through U-shaped portion 168, and put in or take out small items into basket body 112 through U-shaped portion 168. Also, U-shaped portion 168 flexes when basket body 112 is stressed, making basket body 112 sturdy and flexible. U-shaped portion 168 is formed of a rod bent into a U shape and includes a U-shaped portion first end 172, a U-shaped portion second end 174, and an open end 170. Open end 170 opposes the rounded end of the U-shape. U-shaped portion 168 lies on its side, with open end 170 facing basket rear side 116.

Straight rod section 176 is coupled to U-shaped portion 168. In this embodiment, straight rod section 176 is coupled to U-shaped portion first end 172. Straight rod section 176 is the part of first bent rod 119 that couples U-shaped portion 168 to arm 128. Straight rod section 176 is straight in this embodiment. Straight rod section 176 includes a straight rod section first end 175, a straight rod section second end 177, and a straight rod longitudinal axis 194. Straight rod longitudinal axis 194 extends longitudinally from straight rod section first end 175 to straight rod section second end 177, as shown in FIG. 6. Straight rod section first end 175 is coupled to U-shaped portion first end 172. Straight rod section second end 177 is coupled to an arm first end 129 of arm 128, see FIG. 6. Straight rod section 176 is configured, in this embodiment, such that straight rod longitudinal axis 194 is approximately perpendicular to a basket bottom plane 123 of basket body 112, shown in FIG. 6.

Arm 128 is the part of first bent rod 119 that couples hook 126 to straight rod section 176. Arm 128 is a straight portion of first bent rod 119, in this embodiment. Arm 128 includes arm first end 129, and an arm second end 130 opposing arm first end 129, and an arm longitudinal axis 131. Arm longitudinal axis 131 extends longitudinally from arm first end 129 to arm second end 130. Arm first end 129 is coupled to straight rod section second end 177 of straight rod section 176. Arm 128 is configured such that an arm angle 156 between arm longitudinal axis 131 and straight rod longitudinal axis 194 is between about 20 degrees and about 50 degrees, see FIG. 3 and FIG. 6. Arm angle 156 helps basket body 112 hang in an upright but offset position when shopping cart basket 110 is hung from handle 244 or rod 342, as shown in FIG. 1 and FIG. 2. Arm angle 156 allows arm 128 and hook 126 to reach handles 244 or rod 342 at an angle to basket body 112. Basket body 112 hangs offset from handle 244 or 342 so that basket body 112 does not interfere with the user of cart 240 or 340, but is convenient for use by the user. In some embodiments, arm angle 156 is between about 30 degrees and about 40 degrees. In some embodiments, arm angle 156 is about 35 degrees. These ranges and values have been determined to position basket body 112 optimally when hung from handles 244 or rod 342. In some situations, other cart types are used with other cart physical configurations, and a different arm angle 156 may be used to hold basket body 112 in position on the other cart configurations.

Hook 126 is the hook-shaped part of first bent rod 119. Hook 126 is coupled to arm second end 130, as shown in FIG. 3 and FIG. 6. Hook 126 is hook-shaped to grab and hang shopping cart basket 110 from a shopping cart. Hook 126 hangs from shopping cart basket handles 244 or rod 342 as shown in FIG. 1 and FIG. 2, but this is not meant to be limiting. Hook 126 can hang from any part of shopping cart 240 or 340.

U-shaped portion 168, straight rod section 176, arm 128, and hook 126 all lie in first end side plane 164, as shown in FIG. 4 and FIG. 5.

Second bent rod 121 is similar in shape and purpose to first bend rod 119. Second bent rod 121 is bent into a shape that lies in a single plane, second end side plane 166, as shown in FIG. 4 and FIG. 5. Second bent rod 120 includes a U-shaped portion 169, a straight rod section 178, arm 134, and hook 132, as shown in FIG. 3.

U-shaped portion 169 is the part of second bent rod 120 that form a second side of basket body 112. U-shaped portion 169 is a portion of second bent rod 120 that is bent into a U shape. A user can put their hand through U-shaped portion 169, and put in or take out small items into basket body 112 through U-shaped portion 169. Also, U-shaped portion 169 flexes when basket body 112 is stressed, making basket body 112 sturdy and flexible. U-shaped portion 169 is formed of a rod bent into a U shape, similar to U-shaped portion 168.

Straight rod section 178 is coupled to U-shaped portion 169. Straight rod section 178 is the part of second bent rod 121 that couples U-shaped portion 169 to arm 134. Straight rod section 178 is straight in this embodiment. Straight rod section 178 includes a first end of straight rod 178, a second end of straight rod 178, and a straight rod longitudinal axis 196, similar to straight rod section 176. Straight rod section 178 couples U-shaped portion first end 173 of U-shaped portion 169 to arm 134, see FIG. 3. Straight rod section 178 is configured, in this embodiment, such that straight rod longitudinal axis 196 is approximately perpendicular to a basket bottom plane 123 of basket body 112.

Arm 134 is the part of second bent rod 121 that couples hook 134 to straight rod section 178. Arm 134 is a straight portion of second bent rod 121, in this embodiment. Arm 134 includes an arm first end 135, an arm second end 136 opposing arm first end 135, and a second arm longitudinal axis (not numbered) that forms an arm angle 158 between the second arm longitudinal axis and straight rod longitudinal axis 196 of between about 20 degrees and about 50 degrees, as described for arm angle 156. Arm angle 158 helps basket body 112 hang in an upright but offset position when shopping cart basket 110 is hung from handle 244 or rod 342, as shown in FIG. 1 and FIG. 2. Arm angle 158 allows arm 134 and hook 132 to reach handle 244 or rod 342 at an angle to basket body 112. Basket body 112 hangs offset from handle 244 or rod 342 so that basket body 112 does not interfere with a user of cart 240 or 340, but is convenient for use by the user. In some embodiments, arm angle 158 is between about 30 degrees and about 40 degrees. In some embodiments, arm angle 158 is about 35 degrees. These ranges and values have been determined to position basket body 112 optimally when hung from handle 244 or rod 342. In some situations, other cart types are used with other cart physical configurations, and a different arm angle 158 may be used to hold basket body 112 in position on the other cart configurations.

Hook 132 is the hook-shaped part of second bent rod 121. Hook 132 is coupled to arm second end 136, as shown in FIG. 3. Hook 132 is hook-shaped to grab and hang shopping cart basket 110 from a shopping cart. Hook 132 hangs from shopping cart basket handle 244 or rod 342 as shown in FIG. 1 and FIG. 2, but this is not meant to be limiting. Hook 132 can hang from any part of shopping cart 240 or 340.

U-shaped portion 169, straight rod section 178, arm 134, and hook 132 all lie in second end side plane 166, as shown in FIG. 4 and FIG. 5.

Open top 124 lies in a plane 161 in this embodiment, as seen in FIG. 4 and FIG. 6. Arms 128 and 134 extend in a direction away from basket body 112. In this embodiment, first and second arm 128 and 134 are not perpendicular to open top plane 161, but this is not meant to be limiting. In some embodiments, arms 128 and 134 extend away from basket body 112 perpendicular to open top plane 161

In the embodiment of shopping cart basket 110 shown in the figures, first arm 128 extends from a first end side top rear corner 140 in a direction away from basket body 112, forming arm angle 156 of between about 30 and about 50 degrees between arm 128 and a longitudinal axis 194 which is perpendicular to open top plane 161, see FIG. 3 and FIG. 6. Similarly, second arm 134 extends from a second end side top rear corner 148 in a direction away from basket body 112, forming arm angle 158 of between about 30 and about 50 degrees between arm 134 and longitudinal axis 196 perpendicular to open top plane 161, see FIG. 3. Having arm angles 156 and 158 be between about 20 and about 50 degrees has been shown to be optimum for positioning basket body 112 when shopping cart basket 110 is hanging from a shopping cart, as discussed above. In some embodiments, arm angles 156 and 158 are designed to be between about 30 and about 40 degrees. In a specific embodiment, arm angles 156 and 158 are designed to be about 35 degrees. These values of arm angles 156 and 158 have been shown to position basket body 112 upright when shopping cart basket 110 is hung from a rod 342 of a flatbed cart 340, as shown in FIG. 2, for example. It is to be understood that other values for arm angles 156 and 158 can be used for other configurations of shopping carts.

Shopping cart basket 110 in the embodiment shown in the figures also includes a first stabilizer loop 180 and a second stabilizer loop 184, see FIG. 2, FIG. 3, FIG. 4, and FIG. 5. First and second stabilizer loops 180 and 184 are used to stabilize shopping cart basket 110 when shopping cart basket 110 is hung between two vertical rods, as shown in FIG. 2, for example. First and second stabilizer loops 180 and 184 prevent basket body 112 from swinging between the two vertical rods. First and second stabilizer loops 180 and 184 are rigid protuberances that extend from basket body 112. In this embodiment first and second stabilizer loops 180 and 184 are loops made of bent rod, but this is not meant to be limiting. First and second stabilizer loops 180 and 184 can be made of solid metal or other rigid protuberance. First stabilizer loop 180 extends from first end side 118 perpendicular to first end side plane 164, as shown in FIG. 4 and FIG. 5. Second side loop 184 extends from second side end 120 perpendicular to second end side plane 166. In some embodiments, first and second stabilizer loops 180 and 184 are coupled to basket body 112 in other locations. In some embodiments, first and second stabilizer loops 180 and 184 are not used. In some embodiments, only one stabilizer loop is used, or more than two stabilizer loops are used.

Shopping cart basket 110 in the embodiment shown in the figures also includes a first rod hook 188 and a second rod hook 190, best seen in FIG. 4, FIG. 5, and FIG. 6. First and second rod hooks 188 and 190 are used to hook a rod of a shopping cart, for example, or other nearby fixture, to hold shopping cart basket 110 from swinging or moving. First and second rod hooks 188 and 190 are hooks made of bent wire in this embodiment, but can be any type of hooks or hook elements. First and second rod hooks 188 and 190 are means to hook basket body 112 to a horizontal rod of a shopping cart. In some embodiments, first and second rod hooks 188 and 190 are configured to be a means to hook basket body 112 to a vertical rod of a shopping cart. First and second rod hooks 188 and 190 are coupled to rear side 116 in this embodiment, but this is not meant to be limiting. First and second rod hooks 188 and 190 can be coupled to any part of basket body 112. In the embodiment shown in the figures, first and second rod hooks 188 and 190 are means to hook rear side 116 to a horizontal rod of a shopping cart. In some embodiments, first and second rod hooks 188 and 190 are means to hook front side 114 to a horizontal rod of a shopping cart.

First and second rod hooks 188 and 190 are each coupled to rear side 116 in the embodiment shown in the figures, and extend in a direction away from front side 114, approximately perpendicular to rear side 116, as shown in FIG. 5 and FIG. 6. In some embodiments, only one of first or second rod hooks 188 or 190 is used. In some embodiments, more than two rod hooks are used.

Shopping cart basket 110 in the embodiment shown in the figures also includes one or more shopping bag hanger loop. Shopping cart basket 110 includes a set of front shopping bag hanger loops 210, best seen in FIG. 4. Front shopping bag hanger loops 210 includes shopping bag hanger loop 212, shopping bag hanger loop 214, and shopping bag hanger loop 216. Shopping cart basket 110 also includes a set of rear shopping bag hanger loops 220, best seen in FIG. 5. Rear shopping bag hanger loops 220 includes shopping bag hanger loop 222, shopping bag hanger loop 224, and shopping bag hanger loop 226) FIG. 3 and FIG. 5). A shopping bag hanger loop is a loop of wire rod, in this embodiment, that is used to hang shopping bags from. Often an employee using a shopping cart needs a supply of shopping bags, such as plastic shopping bags with handles. A shopping bag hanger loop, such as loops 212, 214, 216, 222, 224, and 226, can be used to hang the shopping bags from. For example, a handle or a hanging opening of a shopping bag can be extending over one of shopping bag hanger loops 212, 214, 216, 222, 224, or 226, hanging the shopping bags within easy reach of the employee. Shopping bag hanger loops are used in sets, such as set of front shopping bag hanger loops 210 and set of rear shopping bag hanger loops 220, because a set of three shopping bag hanger loops is optimum for receiving each of the two handles and the shopping bag hanging opening of a stack of shopping bags.

Set of front shopping bag hanger loops 210 extend from a front side top rail 115, as shown in FIG. 4 and FIG. 6. Each shopping bag hanger loop 212, 214, and 216 is a U-shaped loop with each end coupled to front side top rail 115. For example, shopping bag hanger loop 214 includes a hanger loop first end 211 coupled to front side top rail 115 and a hanger loop second end 213 coupled to front side top rail 115, as shown in FIG. 4.

Each of shopping bag hanger loops 212, 214, 216, 222, 224, and 226 is a means to hang shopping bags from a side of basket body 112. Set front of shopping bag hanger loops 210 is a means to hang shopping bags from front side 114 of basket body 112. Set of rear shopping bag hanger loops 220 is a means to hang shopping bags from rear side 116 of basket body 112. It is to be understood that shopping bag hanger loops 212, 214, 216, 222, 224, and 226 can be formed in shapes other than loops, and can be formed of solid metal or other rigid material in some embodiments.

In the embodiment shown in the figures, set of front shopping bag hanger loops 210 is coupled to front side 114 and lies in a front side plane 113, see FIG. 6. Front shopping bag hanger loops 210 extend from a front side top rail 115 as shown in FIG. 4. Set of rear shopping bag hanger loops 220 is coupled to rear side 116, and lies in a rear side plane 117. This places the shopping bags hanging from set of front shopping bag hanger loops 210 or set of rear shopping bag hanger loops 220 in easy reach of the user of shopping cart basket 110.

Figure 7:
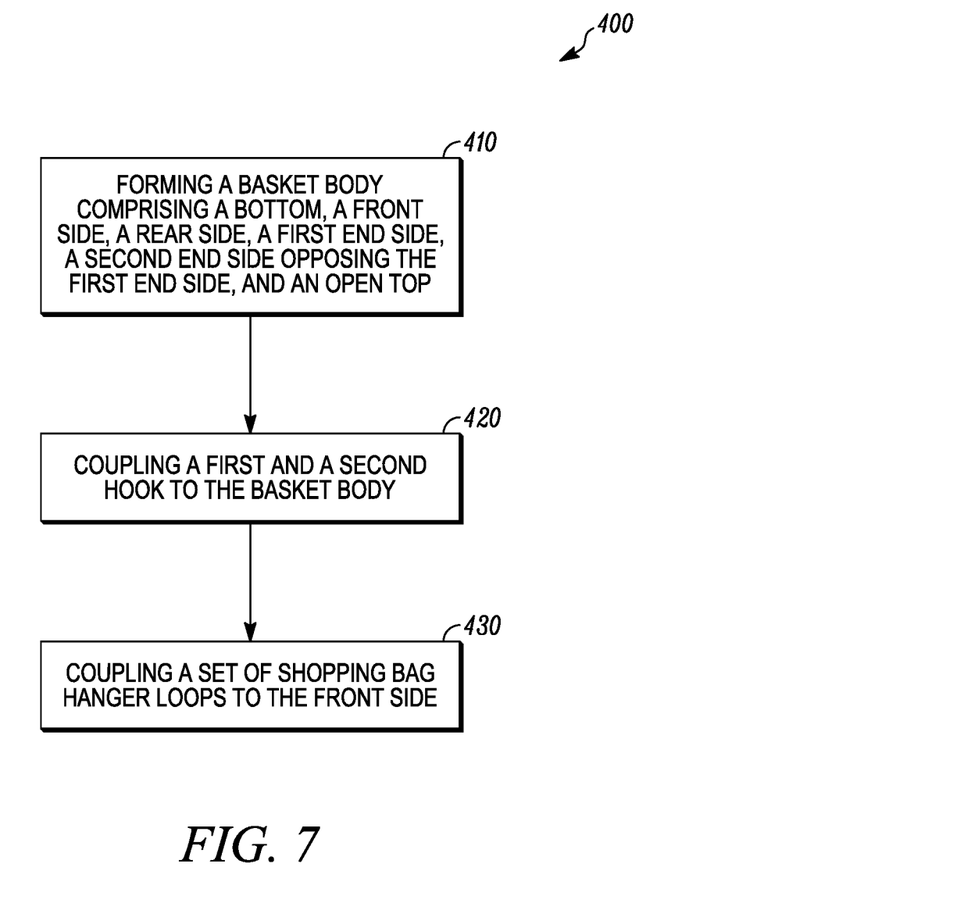
FIG. 7 illustrates a method of forming a shopping cart basket.

FIG. 7 illustrates a method 400 of forming a shopping cart basket. Method 400 of forming a shopping cart basket includes an act 410 of forming a basket body. In some embodiments, the basket body includes a bottom, a front side, a rear side, a first end side, a second end side opposing the first end side, and an open top. In some embodiments, the basket body is formed of a wire grid. Method 400 also includes an act 420 of coupling a first and a second hook to the basket body. The first and the second hook are used to hang the shopping cart basket from a shopping cart. And method 400 includes an act 430 of coupling a set of shopping bag hanger loops to the front side.

Method 400 can include many other acts. In some embodiments, method 400 includes coupling a set of shopping bag hanger loops to the rear side. In some embodiments, method 400 includes coupling a first stabilizer loop to the first end side. In some embodiments, method 400 includes coupling a second stabilizer loop to the second end side. In some embodiments, method 400 includes coupling a rod hook to the basket body. In some embodiments, method 400 includes coupling a rod hook to the rear side such that the rod hook extends in a direction away from the front side approximately perpendicular to the rear side.

In some embodiments, method 400 includes coupling a first arm to the basket body such that the first arm extends from a top corner of a first end side of the basket body, and forms an angle of between about 20 degrees and about 50 degrees between the first arm and a line perpendicular to a plane of the open top. In some embodiments, method 400 includes coupling a first arm to the basket body such that the first arm extends from a top corner of a first end side of the basket body, and forms an angle of between about 30 degrees and about 40 degrees between the first arm and a line perpendicular to a plane of the open top. In some embodiments, method 400 includes coupling a first arm to the basket body such that the first arm extends from a top corner of a first end side of the basket body, and forms an angle of about 35 degrees between the first arm and a line perpendicular to a plane of the open top.

Figure 8:
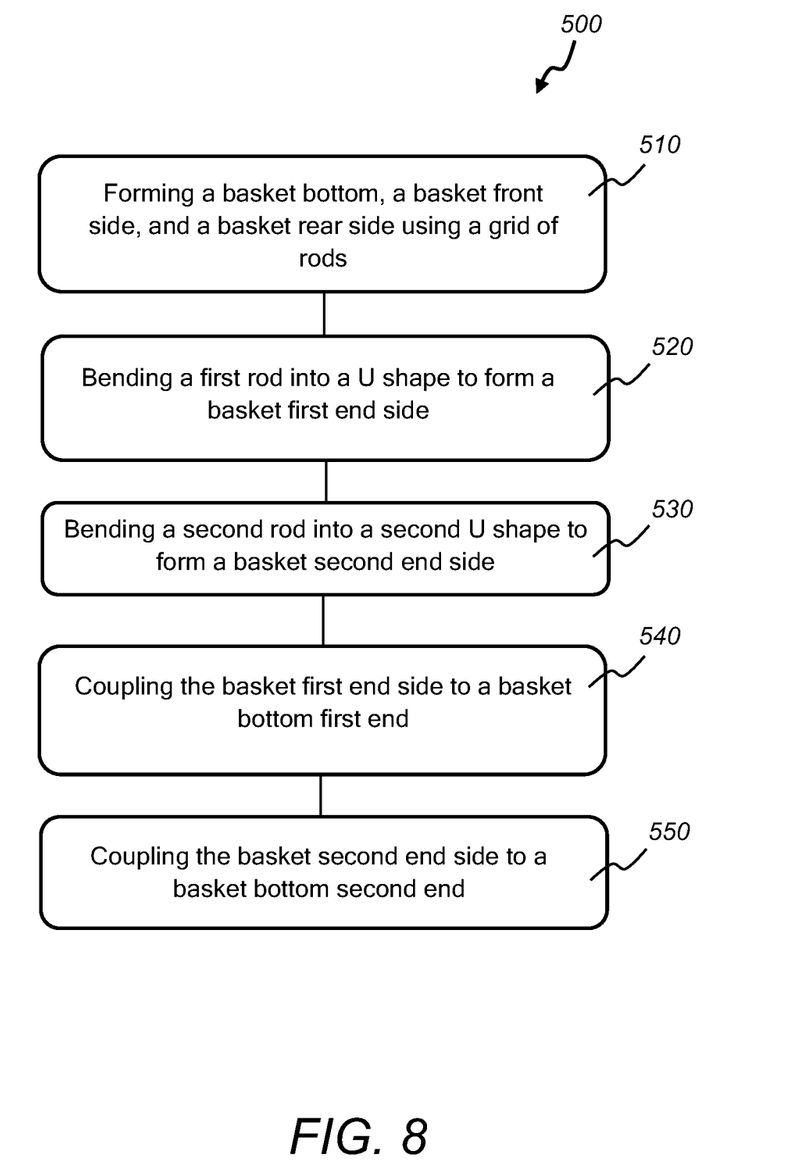
FIG. 8 illustrates a method of assembling a shopping cart basket.

FIG. 8 illustrates a method 500 of assembling a shopping cart basket. Method 500 includes an act 510 of forming a basket bottom, a basket front side, and a basket rear side using a grid of rods. The grid of rods can be plastic coated rods, for example. The basket bottom, basket front side, and basket rear side are coupled to each other. In some embodiments, one grid of rods is bent to form the basket bottom, the basket front side, and the basket rear side from one unitary grid of rods.

Method 500 includes an act 520 of bending a first rod into a first U-shaped portion to form a basket first end side. Method 500 also includes an act 530 of bending a second rod into a second U-shaped portion to form a basket second end side.

Method 500 includes an act 540 of coupling the basket first end side to a basket bottom first end, and an act 550 of coupling the basket second end side to a basket bottom second end. The basket bottom, basket front side, basket rear side, basket first end side, and basket second end side form a shopping cart basket with an open top that is hung from a shopping cart and used to carry items in.

In some embodiments, act 520 of bending the first rod into the first U-shaped portion to form the basket first end side includes coupling a straight rod section to the first U-shaped portion. The straight rod section includes a straight rod section first end coupled to the first U-shaped portion, and a straight rod section second end opposing the straight rod section first end. The straight rod section extends from the first U-shaped portion in a direction away from the basket bottom.

In some embodiments, act 520 of bending the first rod into the first U-shaped portion to form the basket first end side includes coupling an arm to the straight rod section second end. The straight rod section has a straight rod longitudinal axis. The arm forms an arm angle of between about 30 degrees to about 40 degrees between an arm longitudinal axis and the straight rod longitudinal axis. In some embodiments, the arm forms an arm angle of between about 20 degrees to about 50 degrees between the arm longitudinal axis and the straight rod longitudinal axis. In some embodiments, the arm forms an arm angle of between about 35 degrees between the arm longitudinal axis and the straight rod longitudinal axis.

In some embodiments, the arm comprises an arm first end coupled to the straight rod section second end, and an arm second end opposing the arm first end, and wherein the bending the first rod into the first U-shaped portion to form the basket first end side further comprises coupling a hook to the arm second end. In some embodiments, the first U-shaped portion, the straight rod section, the arm, and the hook all lie in the same plane.

Method 500 can includes many other acts. In some embodiments, method 500 includes coupling at least one front shopping bag hanger loop to the basket front side, where the at least one front shopping bag hanger loop extends from a front side top rail and lies in a front side plane. The shopping bag hanger loop can be used to hang shopping bags from.

In some embodiments, method 500 includes coupling a first stabilizer loop to the basket first end side. In some embodiments, method 500 includes coupling a second stabilizer loop to the basket second end side. Stabilizer loops are used to stabilize the shopping cart basket when the shopping cart basket is hung from a flatbed type shopping cart, for example. In some embodiments, the first stabilizer loop is perpendicular to the basket first end side, and the second stabilizer loop is perpendicular to the basket second end side.

In some embodiments, method 500 includes coupling a rod hook to the basket rear side such that the rod hook extends in a direction away from the basket front side approximately perpendicular to the basket rear side.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart basket for affixing to a shopping cart, the shopping cart basket comprising:
   a basket front side;
   a basket rear side;
   a basket bottom;
   an open top;
   a first end side comprising a first bent rod; and
   a second end side opposing the first end side, wherein the second end side comprises a second bent rod;
   wherein the first bent rod lies in a first end side plane, and wherein the first bent rod comprises:
      a U shaped portion comprising:
         a U shaped portion first end;
         a U shaped portion second end; and
         an open end facing the basket rear side;
      a straight rod section coupled to the U-shaped portion first end, wherein the straight rod section comprises a straight rod longitudinal axis, and wherein the straight rod longitudinal axis is perpendicular to a basket bottom plane; and
      an arm comprising:
         an arm first end coupled to the straight rod section;
         an arm second end opposing the arm first end; and
         an arm longitudinal axis;
      and
      a hook coupled to the arm second end.

2. The shopping cart basket of claim 1, wherein an arm angle between the arm longitudinal axis and the straight rod longitudinal axis is between about 20 degrees and about 50 degrees.

3. The shopping cart basket of claim 1, further comprising a stabilizer loop coupled to the first end side.

4. The shopping cart basket of claim 3, wherein the stabilizer loop extends perpendicular to a first end side plane.

5. The shopping cart basket of claim 1, further comprising a rod hook coupled to the basket rear side, extending perpendicular to the basket rear side in a direction away from the basket front side.

6. The shopping cart basket of claim 1, further comprising a shopping bag hanger loop coupled to the basket front side, wherein the shopping bag hanger loop is a U-shaped loop comprising a hanger loop first end coupled to a front side top rail, a hanger loop second end coupled to the front side top rail, and wherein the shopping bag hanger loop lies in a front side plane.

7. The shopping cart basket of claim 1, further comprising at least one front shopping bag hangar loop coupled to the front side.

8. The shopping cart basket of claim 7, wherein the at least one front shopping bag hangar loop lies in a front side plane.

9. The shopping cart basket of claim 8, further comprising at least one rear shopping bag hangar loop coupled to the basket rear side, wherein the at least one rear shopping bag hanger loop lies in a rear side plane.

10. The shopping cart basket of claim 1, wherein the basket front side, the basket rear side, and the basket bottom are formed of a wire grid.

11. A method of assembling a shopping cart basket, the method comprising:
   forming a basket bottom, a basket front side, and a basket rear side using a grid of rods;

bending a first rod into a first U-shaped portion to form a basket first end side;

coupling a straight rod section to the first U-shaped portion, wherein the straight rod section comprises a straight rod section first end coupled to the first U-shaped portion, and a straight rod section second end opposing the straight rod section first end, and wherein the straight rod section extends from the first U-shaped portion in a direction away from the basket bottom;

bending a second rod into a second U-shaped portion to form a basket second end side;

coupling the basket first end side to a basket bottom first end; and coupling the basket second end side to a basket bottom second end.

12. The method of claim 11, further comprising coupling an arm to the straight rod section second end, wherein the straight rod section has a straight rod longitudinal axis, and wherein the arm forms an arm angle of between about 35 degrees between an arm longitudinal axis and the straight rod longitudinal axis.

13. The method of claim 11, further comprising coupling an arm to the straight rod section second end, wherein the straight rod section has a straight rod longitudinal axis, and wherein the arm forms an arm angle of between about 30 degrees to about 40 degrees between an arm longitudinal axis and the straight rod longitudinal axis.

14. The method of claim 13, wherein the arm comprises an arm first end coupled to the straight rod section second end, and an arm second end opposing the arm first end, and wherein the bending the first rod into the first U-shaped portion to form the basket first end side further comprises coupling a hook to the arm second end.

15. The method of claim 14, wherein the first U-shaped portion, the straight rod section, the arm, and the hook all lie in the same plane.

16. The method of claim 15, further comprising coupling at least one front shopping bag hanger loop to the basket front side, wherein the at least one front shopping bag hanger loop extends from a front side top rail and lies in a front side plane.

17. The method of claim 15, further comprising coupling a rod hook to the basket rear side such that the rod hook extends in a direction away from the basket front side perpendicular to the basket rear side.

18. The method of claim 15, further comprising:
coupling a first stabilizer loop to the basket first end side; and
coupling a second stabilizer loop to the basket second end side.

19. The method of claim 18, wherein the first stabilizer loop is perpendicular to the basket first end side, and the second stabilizer loop is perpendicular to the basket second end side.

* * * * *